United States Patent [19]

Bell et al.

[11] 4,196,522
[45] Apr. 8, 1980

[54] ALIGNMENT FIXTURE

[75] Inventors: Grover C. Bell, Norris; O. Theodore Gibson, Lenoir City, both of Tenn.

[73] Assignee: The United States of America as represented by the United States Department of Energy, Washington, D.C.

[21] Appl. No.: 34,790

[22] Filed: Apr. 30, 1979

[51] Int. Cl.² .......................... B23Q 3/04; G01B 5/24
[52] U.S. Cl. .................. 33/174 TD; 33/1 D; 33/185 R
[58] Field of Search .......... 33/1 D, 174 TA, 174 TB, 33/174 TC, 174 TD, 180 R, 181 R, 185 R; 269/71

[56] References Cited

U.S. PATENT DOCUMENTS

| 3,270,423 | 9/1966 | Birrell et al. ............... 33/174 TA |
| 3,524,261 | 8/1970 | Klink .............................. 33/174 TA |
| 3,829,978 | 8/1974 | Basin et al. ................... 33/174 TA |

FOREIGN PATENT DOCUMENTS

| 447590 | 3/1948 | Canada ........................... 33/174 TD |
| 1438270 | 6/1976 | United Kingdom ............ 33/174 TA |

*Primary Examiner*—William D. Martin, Jr.

*Attorney, Agent, or Firm*—R. V. Lupo; Stephen D. Hamel; David E. Breeden

[57] ABSTRACT

A part alignment fixture is provided which may be used for precise variable lateral and tilt alignment relative to the fixture base of various shaped parts. The fixture may be used as a part holder for machining or inspection of parts or alignment of parts during assembly and the like. The fixture includes a precisely machined diameter disc-shaped hub adapted to receive the part to be aligned. The hub is nested in a guide plate which is adapted to carry two oppositely disposed pairs of positioning wedges so that the wedges may be reciprocatively positioned by means of respective micrometer screws. The sloping faces of the wedges contact the hub at respective quadrants of the hub periphery. The lateral position of the hub relative to the guide plate is adjusted by positioning the wedges with the associated micrometer screws. The tilt of the part is adjusted relative to a base plate, to which the guide plate is pivotally connected by means of a holding plate. Two pairs of oppositely disposed wedges are mounted for reciprocative lateral positioning by means of separate micrometer screws between flanges of the guide plate and the base plate. Once the wedges are positioned to achieve the proper tilt of the part or hub on which the part is mounted relative to the base plate, the fixture may be bolted to a machining, inspection, or assembly device.

3 Claims, 2 Drawing Figures

ALIGNMENT FIXTURE

BACKGROUND OF THE INVENTION

This invention was made during the course of, or under, a contract with the U.S. Department of Energy.

This invention relates generally to precision alignment fixtures, and more specifically to an alignment fixture for both precision lateral and tilt alignment of a part carried by said fixture relative to the fixture base.

In the art of precision part alignment, it is frequently necessary to make minute adjustments in the alignment of a part relative to the holding fixture for various reasons. Some examples of devices which require fine adjustment of part alignment include optical devices, high-precision measuring or inspection devices, and part fixtures for numerically controlled machines.

The general method used in most positioning or alignment devices is based upon the use of conventional micrometer screws. Such devices conventionally operate by direct force upon the part to be adjusted. This method limits the precision by which a part can be adjusted due to limitations in pitch of the threads on the screws. It will be readily appreciated that this imposes a definite limitation on the ultimate precision that may be obtained with micrometer screws. Another disadvantage of the conventional micrometer screw method is that it is difficult to adjust the position of a part and simultaneously maintain a rigid support.

It will be obvious that there is a need to provide an alignment fixture having improved precision and versatility over what is presently available.

SUMMARY OF THE INVENTION

In view of the above need, it is a primary of this invention to provide a versatile precision alignment fixture for adjusting the alignment of a part carried by said fixture.

Further, it is an object of this invention to provide an alignment fixture for precise lateral and tilt alignment of a part carried by said fixture.

Yet another object of this invention is to provide an alignment fixture as in the above objects wherein the part is held securely while alignment adjustments are made.

Other objects and many of the attendant advantages of the present invention will be obvious from the following detailed description taken in conjunction with the drawings.

DETAILED DESCRIPTION

Figure 1:
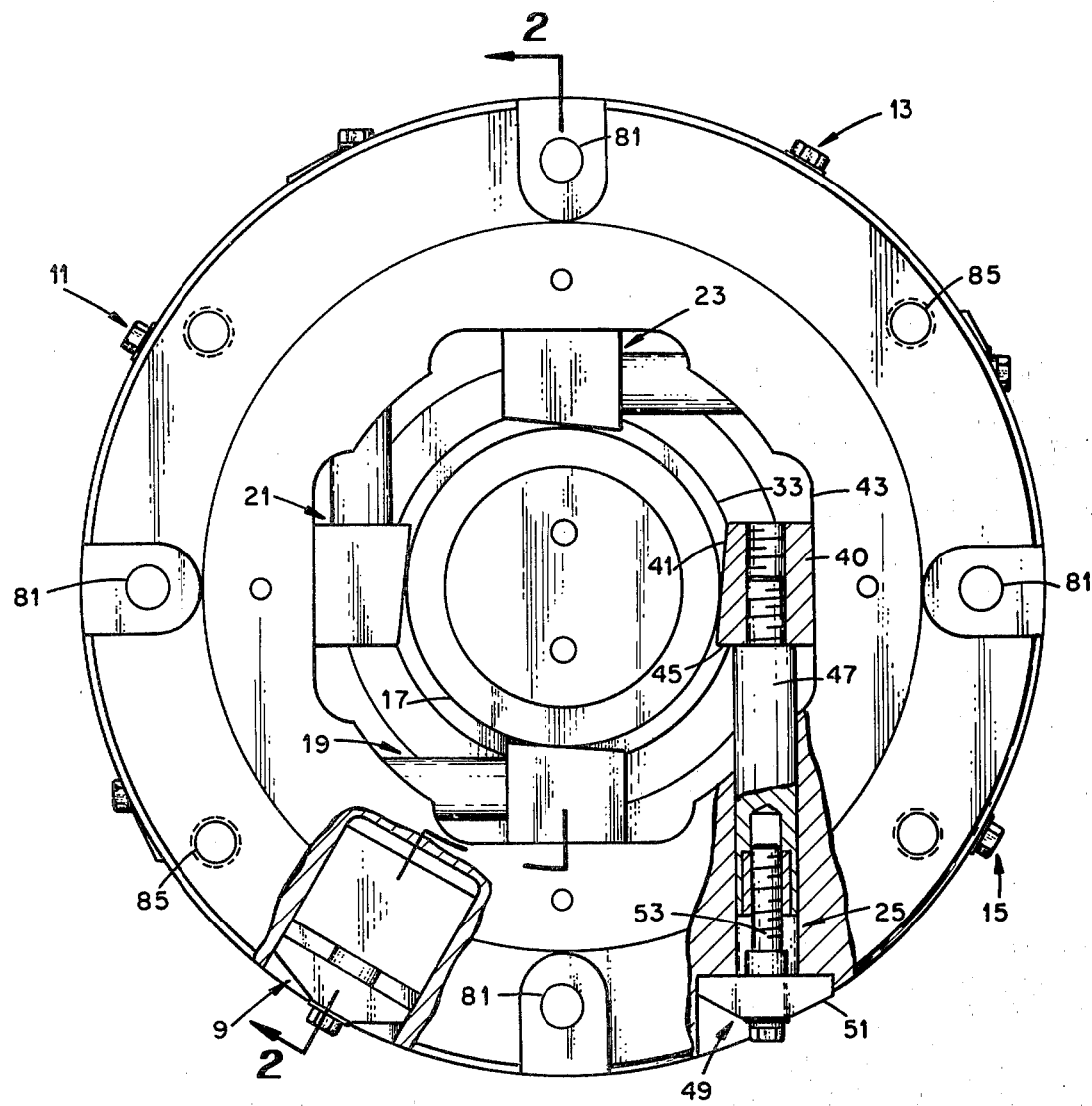
FIG. 1 is a plan view, partly broken away, of an alignment fixture according to the present invention.
Figure 2:
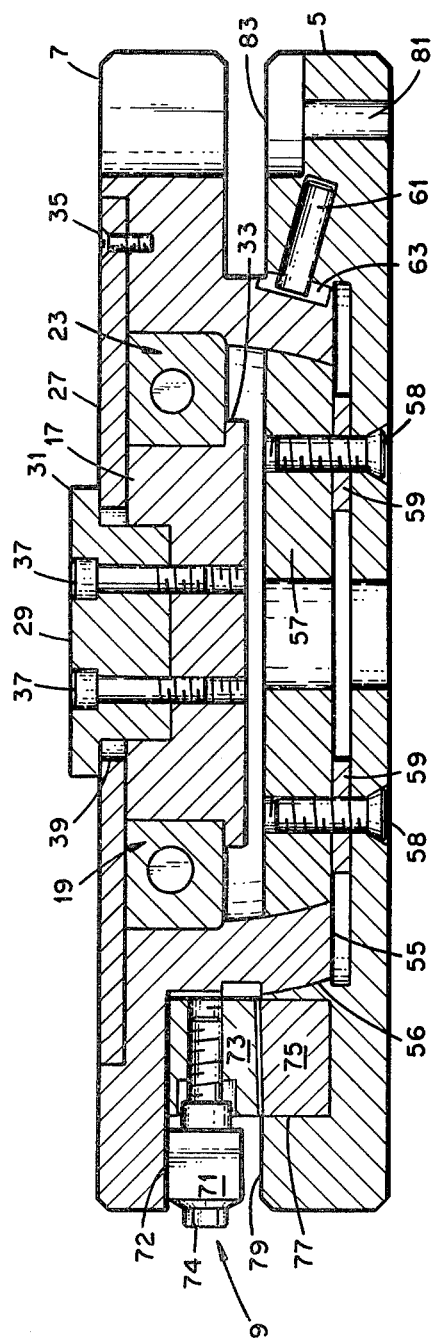
FIG. 2 is an elevational, sectional view taken along line 2—2 of FIG. 1.

Referring to the drawings, the fixture comprises a circular base plate 5, a circular guide plate 7 pivotally mounted to the base plate 5, a plurality of tilt adjusting wedge assemblies 9, 11, 13 and 15 mounted between peripheral flanges of the base plate 5 and guide plate 7, a precision machined central hub 17 located in a central opening in the guide plate 7, a plurality of lateral adjustment wedge assemblies 19, 21, 23 and 25 arranged between inner walls of the guide plate central opening and the hub 17, a face plate 27 (removed in FIG. 1) secured to the guide plate 7 and a cylindrical part holding cap 29 (removed in FIG. 1) which has a portion extending through a central opening in the face plate 27 and secured to the hub 17. The part holding cap 29 has an outer flange portion 31 which is larger in diameter than the central opening of the face plate 27 so that the hub 17 is held in assembly within the guide plate opening by means of the cap 29 and a back flange 33 of the hub 17 which contacts the lower surfaces of the wedges of the wedge assemblies 19–25. The face plate 27 fits in an annular groove in the face of the guide plate 7 and is secured to the guide plate by means of screws 35. The part holding cap 29 is secured to the hub by means of bolts 37 which threadably engage the hub 17.

The face of the cap may take various forms depending upon the type of part to be attached thereto. The opening 39 in the face plate 27 is larger than the diameter of the body of the cap 29 extending through the opening to allow lateral alignment of a part attached to the cap 29 and hub 17 assembly by means of adjustments of the wedges 19–25.

Each wedge assembly, as illustrated by the sectional wedge assembly 25, includes a wedge block 40 having an inclined surface 41 which contacts the hub 17. The opposite surface of the wedge block forms a planar bearing surface and rests against the smooth base surface of a corresponding groove 43 machined in the guide plate 7. The base 45 of the wedge block 40 is attached to a guide rod 47 which extends through an opening in the guide plate 7 to a micrometer screw assembly 49 mounted in the peripheral flange of the guide plate 7.

The micrometer screw assembly includes a mounting head 51 attached to the peripheral flange of the guide plate 7. The micrometer screw 53 is journaled in the mounting head 51 with its threaded portion threadably engaging the guide rod 47 so that the corresponding wedge block 40 may be reciprocatively positioned by turning the micrometer screw 53.

The wedge assemblies 19–25 are mounted in two oppositely disposed pairs so that the inclined sides 41 of the corresponding wedge blocks 40 contact the hub 17 at respective quandrants (90° angular displacements) of the hub 17 periphery. The precision with which the hub 17, and thus the part, can be adjusted may be varied by using different inclined surface wedge blocks 40. Increased precision can be attained by increasing the angle of the sloped side 41 of the wedge with respect to the base 45.

The tilt alignment of the part mounted on the cap 29 is accomplished by means of the wedge assemblies 9–15. To allow pivoting of the guide plate 7 with respect to the base plate 5, the back of the guide plate includes a rearward extending sleeve 55 which is machined to the form of a hollow, hemispherical segment which fits into a common contoured surface socket 56 in the base plate 5. The guide plate 7 is held in the base plate socket 56 for pivotal displacement by means of a hemispherical segment shaped holding plate 57 connected to the base plate 5 by means of screws 58. The peripheral surface of the holding plate 57 is contoured to match the inner contour of the sleeve 55 of the guide plate 7. This forms a ball and socketlike connection for pivotal displacement. Spacer washers 59 are provided between the base plate 5 and the holding plate 57 to allow limited pivotal movement of the guide plate 7 relative to the base plate 5 sufficient to make the proper tilt adjustments. An antirotation pin 61 is provided in the base plate 5 which extends into a groove 63 in the guide plate 7. The pin 61 prevents relative rotation between the base plate 5 and the guide plate 7 while allowing relative pivotal displacement.

To adjust the tilt of the part mounted on the cap 29, two pairs of oppositely disposed wedge assemblies 9-15 are provided in appropriate openings between the base plate 5 and the guide plate 7 peripheral flanges. Each wedge assembly includes a micrometer screw assembly 71 mounted on the inside face 72 of the guide plate 7 flange, a wedge block 73 which threadably engages the micrometer screw 74 at the base of the wedge, and an insert block 75 which fits into a groove 77 in the inside face 79 of the base plate 5 flange. The insert block 75 has an inclined face surface which matches and contacts the inclined surface of the wedge block 73. The wedge block 73 is positioned for reciprocative displacement radially. The surface of the wedge block 73 opposite the inclined surface slidably engages the inner face 72 of the guide plate flange opening in parallel relation therewith, so that its radial position on the guide plate flange may be adjusted by turning the micrometer screw associated therewith. The mating inclined faces of the wedge block 73 and the insert 75 are arranged so that as the block 73 is moved inward the base plate and guide plate flanges are forced apart. When the block is retracted by the screw the plates are allowed to move closer together. By placing the wedge assemblies 9-15 at the quadrant locations between the base plate and guide plate flanges an operator can, by proper adjustment of the four wedge assemblies 9-15, obtain the desired tilt alignment of a part mounted on the cap 29 relative to the base plate 5. The precision with which the adjustment may be made can be varied by changing the angles of wedge blocks 73 and the inserts 75. The blocks and inserts must have corresponding mating inclined surfaces.

The tilt and lateral alignment may be made prior to or after the fixture has been mounted to a support through mounting holes 81. A separate fixture holding the part to be aligned may be mounted to guide plate 7 by means of bolts threaded into holes 85. The part fixture is adapted to engage the cap 29 of the hub 17 to provide lateral adjustment of the separate fixture holding the part. Once aligned the separate fixture may be secured to the guide plate by tightening the mounting bolts.

Thus it will be seen that a very versatile alignment fixture is provided which allows rigid part fixturing with increased ease of part alignment. The adjustment micrometers may also be calibrated to further improve the ease of precision lateral and tilt alignment of a part. Although the invention has been illustrated by means of a specific embodiment, it will be obvious that various modifications and changes may be made in the illustrated embodiment without departing from the spirit and scope of the following claims attached to and forming a part of this specification.

What is claimed is:

1. A part alignment fixture for precision lateral and tilt alignment of a part held by said fixture, comprising:
   a base plate;
   a guide plate pivotally mounted on said base plate and having a central opening therein;
   a cylindrical hub disposed in said central opening of said guide plate radially spaced from the walls of said central opening of said guide plate;
   two oppositely disposed pairs of lateral adjustment wedge assemblies, each wedge assembly including a generally wedge-shaped block slidably disposed in said radial spacing between said hub and said wall of said guide plate central opening, said wedge block having a base surface, a planar bearing surface perpendicular to said base surface, and an inclined surface opposite said bearing surface, said inclined surface of said wedge block contacting the wall of said hub, said bearing surface contacting a planar bearing surface formed by the base of a corresponding guide groove in said central opening wall of said guide plate parallel to said bearing surface of said wedge block, and means connected to said base surface of said wedge block for reciprocatively adjusting said wedge block along a path perpendicular to said base surface of said wedge block;
   means for adjusting the tilt of said guide plate relative to said base plate; and
   means carried by said hub for holding a part to be aligned by said fixture.

2. The part alignment fixture as set forth in claim 1 wherein said base plate and said guide plate are circular plates each having a peripheral flange and wherein said tilt adjusting means includes two oppositely disposed pairs of tilt adjustment wedge assemblies operatively positioned between said base plate and said guide plate flanges at quadrants thereof for separate reciprical adjustment to obtain the desired tilt of said part relative to said base plate.

3. The part alignment fixture as set forth in claim 2 wherein each of said tilt adjustment wedge assemblies includes a wedge member having a base surface, a planar bearing surface perpendicular to said base surface and an inclined surface opposite said bearing surface, said bearing surface slidably engaging a planar bearing surface in the base of a radially extending guide groove in said peripheral flange of said guide plate parallel to the plane of said guide plate, an insert member mounted in said base plate flange and having an inclined surface matching that of said wedge member and aligned so that said inclined surface of said wedge member and said insert member slidably engage in a parallel surface orientation; and means coupled to said base of said wedge for reciprocatively adjusting said wedge member along a path perpendicular to said base surface of said wedge member.

* * * * *